(12) United States Patent
Clemens et al.

(10) Patent No.: US 12,032,521 B2
(45) Date of Patent: Jul. 9, 2024

(54) VISUALIZATION OF ENERGY DOMAIN DATA

(71) Applicant: Schlumberger Technology Corporation, Sugar Land, TX (US)

(72) Inventors: Werner Clemens, Herzogenrath (DE); Christian Vogt, Aachen (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/254,265

(22) PCT Filed: Nov. 24, 2021

(86) PCT No.: PCT/US2021/060700
§ 371 (c)(1),
(2) Date: May 24, 2023

(87) PCT Pub. No.: WO2022/115514
PCT Pub. Date: Jun. 2, 2022

(65) Prior Publication Data
US 2024/0020271 A1 Jan. 18, 2024

Related U.S. Application Data

(60) Provisional application No. 63/118,223, filed on Nov. 25, 2020.

(51) Int. Cl.
*G06F 16/00* (2019.01)
*G06F 16/16* (2019.01)

(52) U.S. Cl.
CPC ............... *G06F 16/168* (2019.01)

(58) Field of Classification Search
CPC .................................. G06F 16/168
See application file for complete search history.

(56) References Cited

U.S. PATENT DOCUMENTS 6,195,092 B1    2/2001  Dhond et al.
8,434,002 B1 *  4/2013  Shah ............... G06F 40/106
                                             715/255

(Continued)

OTHER PUBLICATIONS

LeTurdu et al., "Benefits of Digital for Better Exploration Planning and Execution", EAGE Digital 2020 Highlights Series, First EAGE Digitalization Conference and Exhibition, Nov. 30-Dec. 3, 2020, 5 pages.

(Continued)

*Primary Examiner* — Alexander Khong
(74) *Attorney, Agent, or Firm* — Jeffrey D. Frantz

(57) ABSTRACT

A method, computer system, and non-transitory computer-readable medium are provided. An energy domain data object is retrieved from a database. The energy domain data object was created using an energy domain software application based on collected energy data. The energy domain data object is embedded in a presentation file and is visualized by executing a presentation application using the presentation file. One or more parameters of the energy domain data object from the presentation file are adjusted. At a second point in time, an updated copy of the energy domain data object from the database is retrieved using the presentation file. A visualization of the energy domain data object is modified based on the updated copy of the domain data object.

17 Claims, 13 Drawing Sheets

(56) References Cited

U.S. PATENT DOCUMENTS

| | | | | |
|---|---|---|---|---|
| 8,661,358 | B2* | 2/2014 | Duncker | G06F 16/972 |
| | | | | 715/765 |
| 10,019,424 | B2* | 7/2018 | Lopez | G06F 8/61 |
| 10,698,586 | B2 | 6/2020 | Meaney et al. | |
| 2009/0125367 | A1* | 5/2009 | Brink | G06Q 50/02 |
| | | | | 705/7.41 |
| 2014/0379317 | A1* | 12/2014 | Sanden | G06T 3/40 |
| | | | | 703/10 |
| 2015/0169748 | A1 | 6/2015 | Gambhir et al. | |
| 2016/0026678 | A1 | 1/2016 | Anderson et al. | |
| 2021/0037353 | A1* | 2/2021 | Locascio | H04L 67/02 |
| 2023/0074310 | A1* | 3/2023 | Carey | G16B 50/40 |

OTHER PUBLICATIONS

Microsoft; "Change the data in an existing chart" retrieved on Feb. 11, 2020 via wayback engine<https://web.archive.org/web/20200807161603/https://support.microsoft.com/en-us/office/change-the-data-in-an-existing-chart-539c9840-7412-4da3-ab06-fcf318e996df>; 4 pages.

Search Report and Written Opinion of International Patent Application No. PCT/US2021/060700 dated Feb. 21, 2022; 10 pages.

* cited by examiner

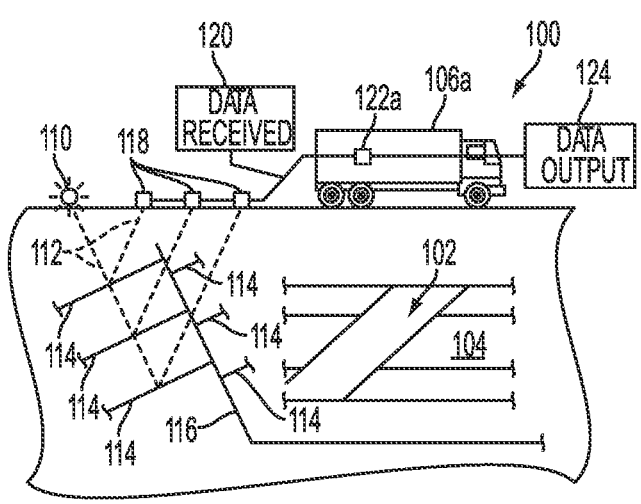
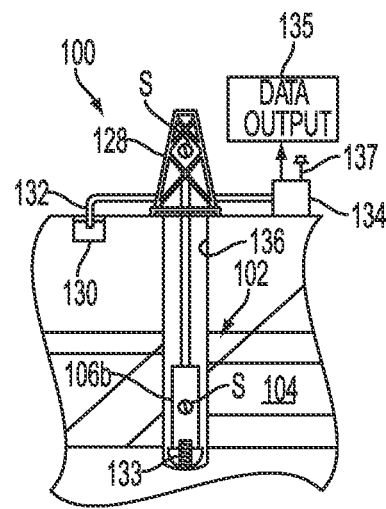
FIG. 1A　　　　FIG. 1B
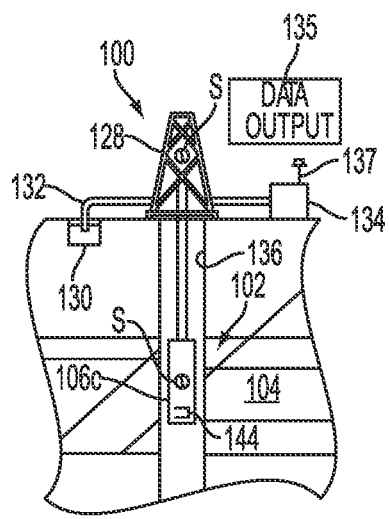
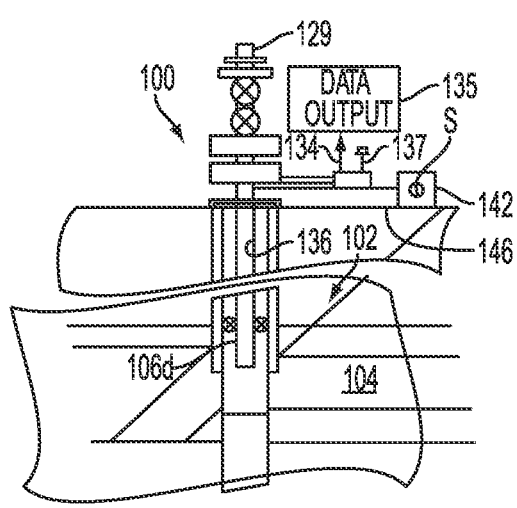
FIG. 1C　　　　FIG. 1D

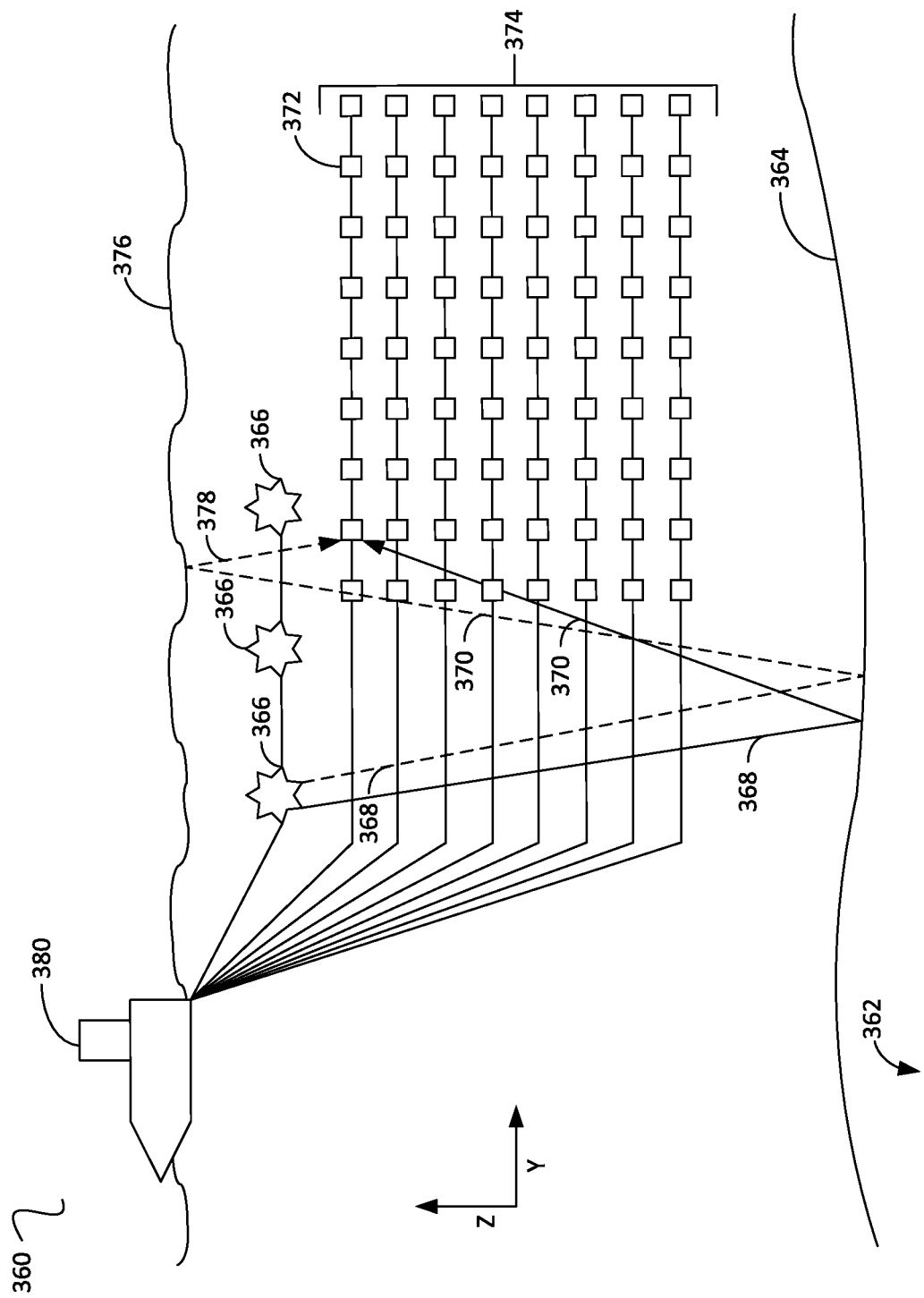

VISUALIZATION OF ENERGY DOMAIN DATA

CROSS-REFERENCE TO RELATED APPLICATIONS

This application is the National Stage Entry of International Application No. PCT/US2021/060700, filed on Nov. 24, 2021, which claims priority to U.S. Provisional Patent Application Ser. No. 63/118,223, which was filed on Nov. 25, 2020. The entirety of this provisional application is incorporated herein by reference.

BACKGROUND

Large amounts of data are gathered and analyzed before, during, and after the well exploration, construction, and completion processes. For example, in exploration, data is collected to reduce uncertainty about predictions of reservoir locations and the geology between the surface and the reservoir. This data can then be used to produce models, and from the models, plans can be developed. The data comes in various forms, including logging, seismic, geologic and petroleum systems modeling, and others. Failing exploration wells (with costs of millions of dollars) can be avoided by consolidating such different data forms.

However, data may change as more information becomes available and models are updated. Existing presentation files used for decision-making may not be up-to-date, leading to decisions made on outdated data. Usually, data in presentation files is in a format (e.g., a picture file, such as a GIF or JPG), which can be used by both the presentation software and the domain (oilfield exploration specific) software. This typically restricts formats to images and text. Richer data formats, that, for example describe plots, are not utilized.

SUMMARY

Embodiments of the present disclosure may provide a method for visualizing energy data. According to the method, an energy domain data object, which was created based on collected energy data using an energy domain software application, is retrieved. The energy domain data object is embedded in a presentation file and visualized by executing a presentation application using the presentation file. One or more parameters of the energy domain data object are adjusted from the presentation file. At a later point in time, an updated copy of the energy domain data object is retrieved from the database using the presentation file. A visualization of the energy domain data object is modified based on the updated copy of the energy domain data object.

In an embodiment, the retrieving of the energy domain data object from the database may include accessing the energy domain data object via a reference to the energy domain data object included in the presentation file.

In an embodiment, the method may further includes copying map data and other domain-specific data directly into the presentation file. A map and the other domain-specific data are interactively visualized based on the copied map data and the other domain-specific data in the presentation file. Location data is obtained from the map data in the presentation file.

In an embodiment, the method may further include zooming in and out on the visualized map data in the presentation file.

In an embodiment, the embedding of the energy domain data object in the presentation file includes creating a reference to the energy domain data object in the presentation file, and creating a reference in the presentation file to computer instructions for visualizing the energy domain data object. The visualizing of the energy domain data object further includes sending a request to a server in response to detecting the reference to the embedded energy-domain data object in the presentation file, receiving a website from the server with a visualization of the energy-domain data object in response to the sending of the request to the server, and embedding the website with the visualization in the presentation file for visualizing by the presentation application.

In an embodiment, the presentation file is a PowerPoint® (PowerPoint is a registered trademark of Microsoft Corporation of Redmond, Washington) file.

In an embodiment, the creating of the reference to the computer instructions is performed by using an add-in to a PowerPoint® application.

In an embodiment, a computing system has one or more processors, and a memory system that includes one or more non-transitory computer-readable media stores instructions that, when executed by at least one of the one or more processors, cause the computing system to perform operations. According to the operations, an energy domain data object, which was created based on collected energy data using an energy domain software application, is retrieved from a database. The energy domain data object is embedded in a presentation file and visualized by executing the presentation application using the presentation file. One or more parameters of the energy domain data object in the presentation file are adjusted. At a later point in time, an updated copy of the energy domain data object is retrieved from the database using the presentation file. A visualization of the energy domain data object is modified based on the updated copy of the energy domain data object.

In an embodiment of the computing system, the retrieving of the energy domain data object from the database further includes accessing the energy domain data object via a reference to the energy domain data object included in the presentation file.

In an embodiment of the computing system, map data and other domain-specific data is copied directly into the presentation file. A map and the other domain-specific data are interactively visualized based on the map data and the other domain-specific data in the presentation file. Location data from the map data in the presentation file is obtained.

In an embodiment of the computing system, the operations further include zooming in and out on the visualized map in the presentation file.

In an embodiment of the computing system, the embedding of the energy domain data object in the presentation file includes creating a reference to the energy domain data object in the presentation file, and creating a reference in the presentation file to computer instructions for visualizing the energy domain data object. The visualizing of the energy domain data object further includes sending a request to a server in response to detecting the reference to the embedded energy-domain data object in the presentation file, receiving a website from the server with a visualization of the energy-domain data object in response to the sending of the request to the server, and embedding the website with the visualization in the presentation file for visualizing by the presentation application.

In an embodiment of the computing system, the presentation file is a PowerPoint® file.

In an embodiment of the computer system, the creating of the reference to the computer instructions is performed by using an add-in to a PowerPoint® application.

Embodiments of the present disclosure may also provide a non-transitory computer-readable medium that stores instructions that, when executed by one or more processors of a computing system, cause the computing system to perform operations. According to the operations, an energy domain data object, which was created based on collected energy data using an energy domain software application, is retrieved. The energy domain data object is embedded in a presentation file and visualized by executing a presentation application using the presentation file. One or more parameters of the energy domain data object in the presentation file are adjusted. At a second point in time an updated copy of the energy domain data object from the database is retrieved using the presentation file. A visualization of the energy domain data object is modified based on the updated copy of the domain data object.

In an embodiment of the non-transitory computer-readable medium, the retrieving of the energy domain data object from the database includes accessing the energy domain data object via a reference to the energy domain data object included in the presentation file.

In an embodiment of the non-transitory computer-readable medium, the operations further include copying map data and other domain-specific data directly into the presentation file. A map and other domain-specific data are interactively visualized based on the map data and the other domain-specific data in the presentation file. Location data from the map data in the presentation file is obtained.

In an embodiment of the non-transitory computer-readable medium, the operations further include zooming in and out on the visualized map in the presentation file.

In an embodiment of the non-transitory computer-readable medium, the embedding of the energy domain data object in the presentation file includes creating a reference to the energy domain data object in the presentation file, and creating a reference in the presentation file to computer instructions for visualizing the energy domain object. The visualizing of the energy domain data object further includes sending a request to a server in response to detecting the reference to the embedded energy-domain data object in the presentation file, receiving a website from the server with a visualization of the energy-domain data object in response to the sending of the request to the server, and embedding the web site with the visualization in the presentation file for visualizing by the presentation application.

In an embodiment of the non-transitory computer-readable medium, the presentation file is a PowerPoint® file, and the creating of the reference to the computer instructions is performed by using an add-in to a PowerPoint® application.

Embodiments of the present disclosure may further provide a computing system including a means for retrieving an energy domain data object from a database, wherein the energy domain data object was created based on collected energy data using an energy domain software application. The computing system further includes a means for embedding the energy domain data object in a presentation file, a means for visualizing the energy domain data object by executing a presentation application using the presentation file, a means for adjusting one or more parameters of the energy domain data object from the presentation file, a means for retrieving, at a second time, an updated copy of the energy domain data object from the database using the presentation file, and a means for modifying a visualization of the energy domain data object based on the updated copy of the energy domain data object.

Embodiments of the present disclosure may further provide a computing system that includes one or more processors, and a memory system. The computing system is configured to retrieve an energy domain data object from a database, wherein the energy domain data object was created based on collected energy data using an energy domain software application. The computing system is configured to embed the energy domain data object in a presentation file and visualize the energy domain data object by executing a presentation application using the presentation file. The computing system is further configured to adjust one or more parameters of the energy domain data object in the presentation file. The computing system is configured to retrieve, at a second point in time, an updated copy of the energy domain data object from the database using the presentation file, and is configured to modify a visualization of the energy domain data object based on the updated copy of the energy domain data object.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DETAILED DESCRIPTION

Figure 2:
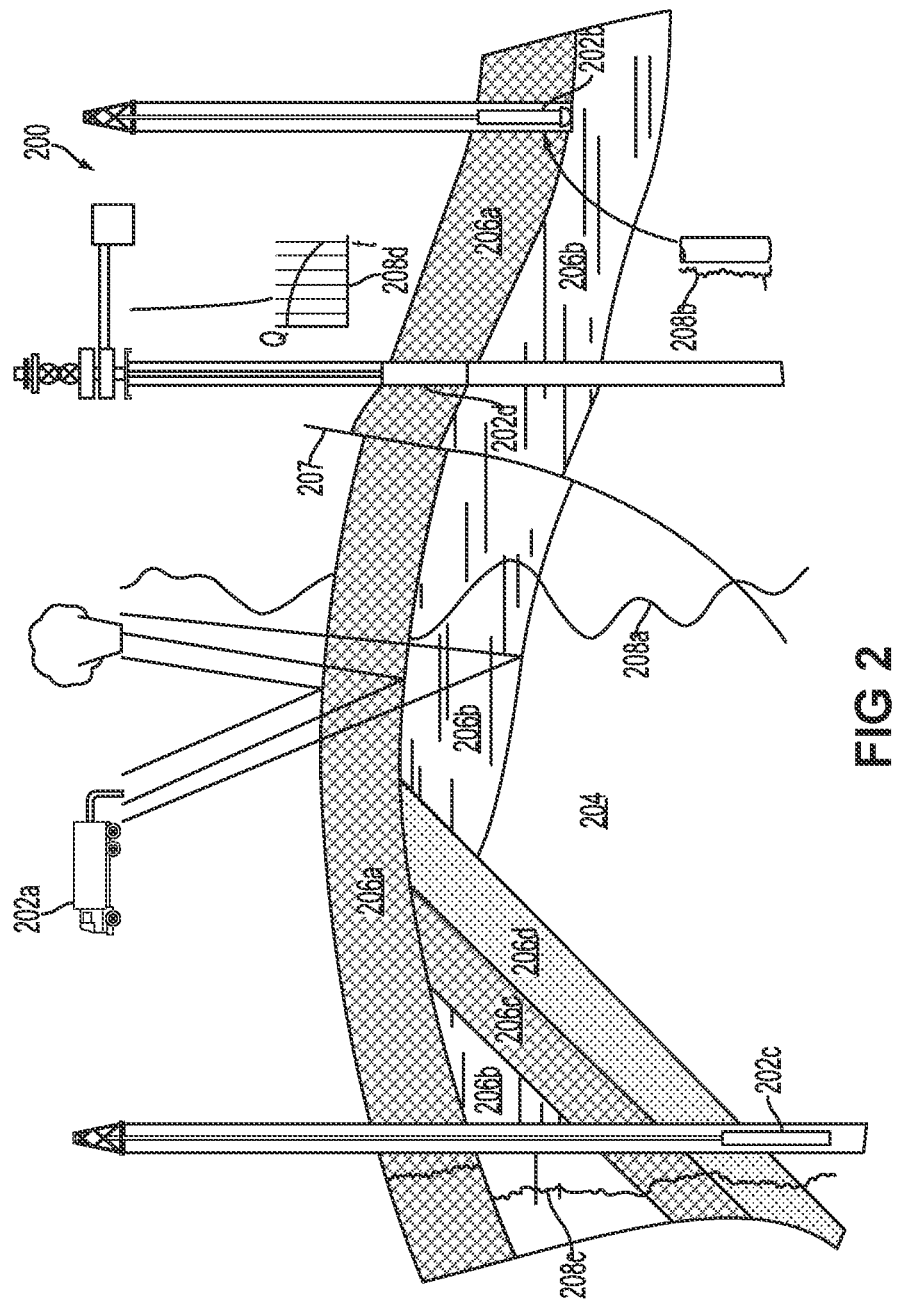

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
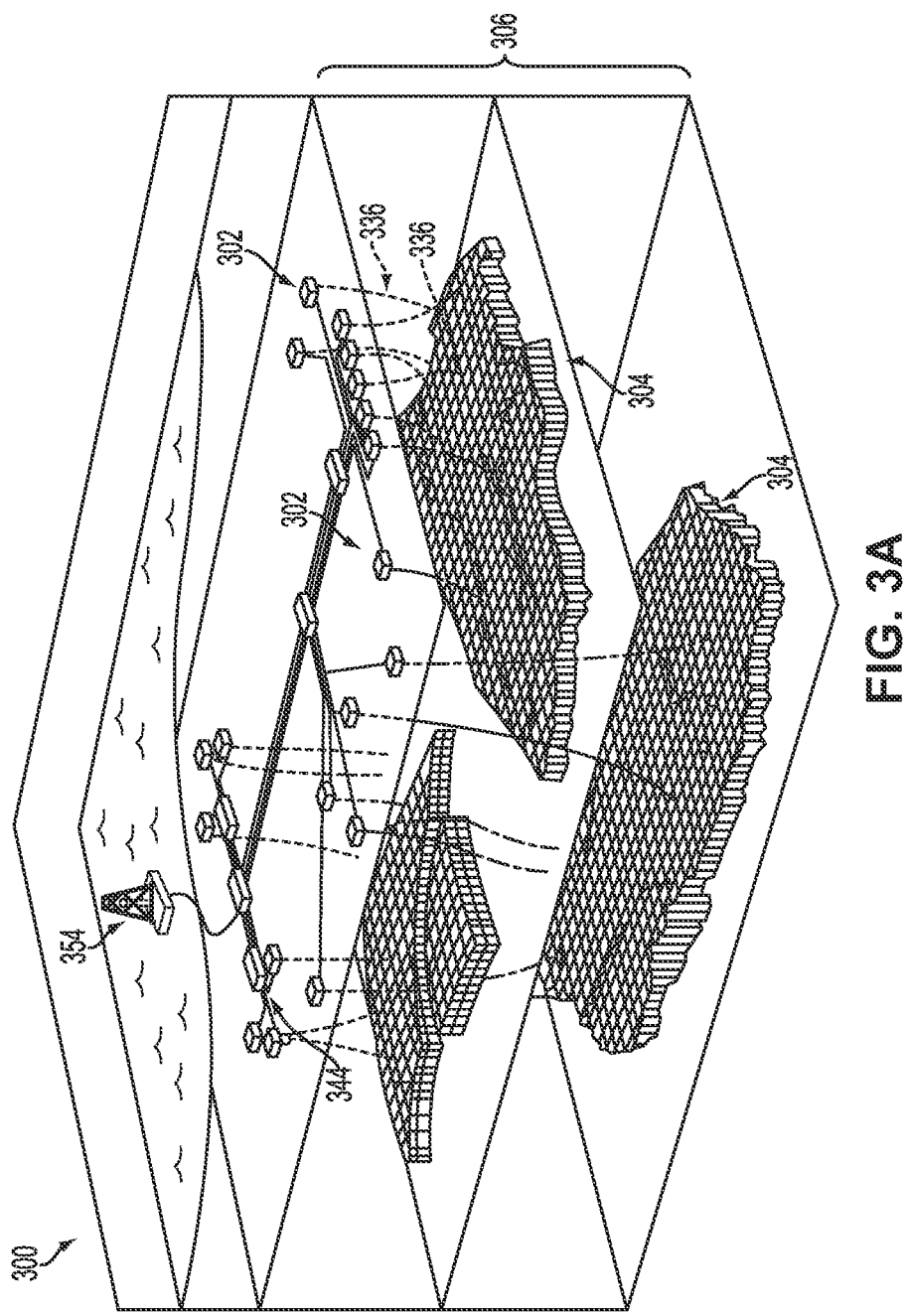

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4:
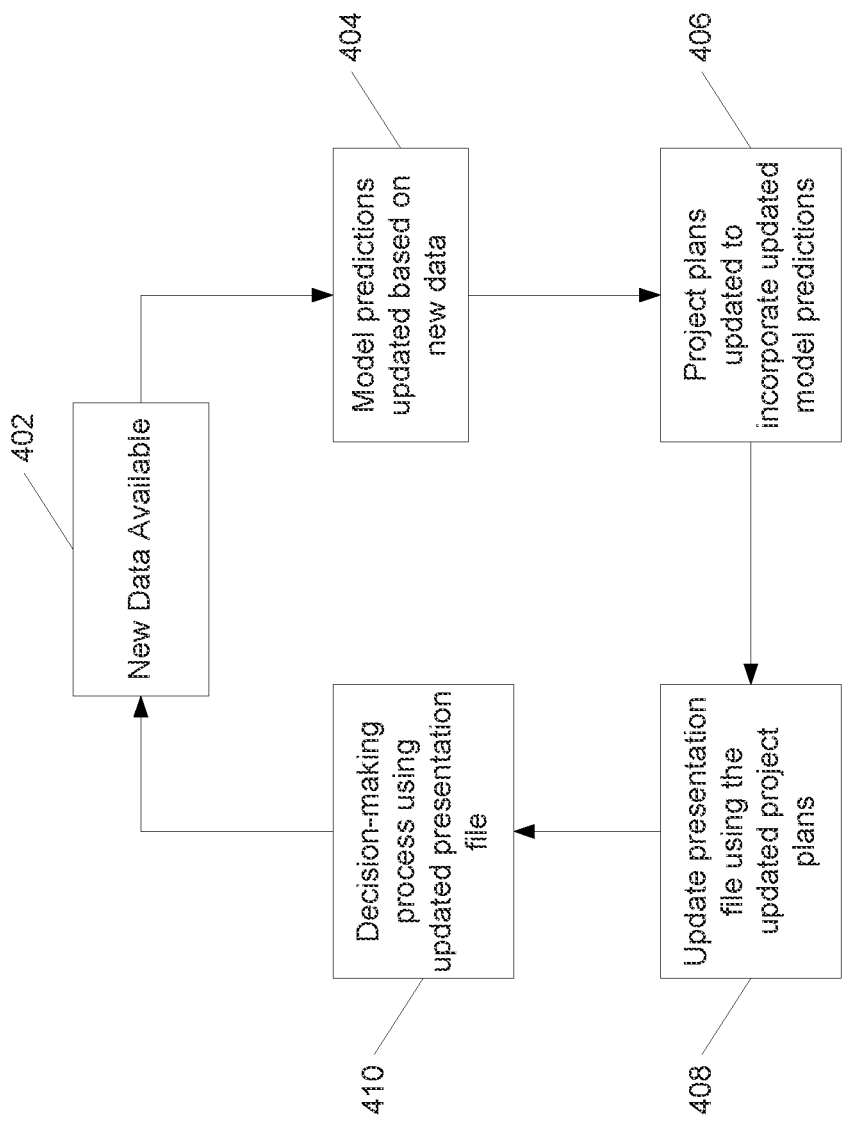
FIG. 4 illustrates a flowchart of a cycle of updating a presentation based on new data, for assisting decision making in an oilfield context, according to an embodiment.

FIG. 4 illustrates a flowchart of a cyclic workflow for data acquisition and updating, according to an embodiment. As shown, as new data becomes available 402, numerical models may be updated, yielding updated model predictions 404. These updated predictions may be employed to update project plans 406. Updated project plans are used to update the presentation file 408, and from the presentation file, decision making (e.g., by humans, artificial intelligence, etc.) may be conducted 410. Such decisions may result in new data becoming available (e.g., different offset wells, more data collected, etc.), and the cycle begins again.

For example, exploring a location for petroleum yields new data (well logs, seismic, etc.), which can be used to update numerical prediction models, as shown. Collecting this information in planning software assists in further decision-making. These decisions (for e.g. newly drilled exploration or production wells) in turn may result in new recorded data. Accordingly, care is taken to update numerical models, the planning database, and the existing presentation files used to present results to the decision makers. However, in practice, completely new presentations are seldomly created to report results. Old presentation data (e.g., slides and charts) is used, which may contain outdated information, and use pixel-based plots which are not easily re-sized on demand.

Embodiments of the disclosure may include adding domain-specific objects from a planning suite (such as EXPLOREPLAN™) in general-purpose, non-oilfield specific presentation files (e.g. POWERPOINT®, EXCEL®, or other similarly formatted presentation files) that may be employed using similarly general-purpose presentation applications. This may be accomplished in various embodiments by copying a reference to a domain-specific object into a presentation file. As a result, a latest version of the domain-specific object may be copied into the presentation file. The reference may be a file path, if the domain-specific object is local, or a web address of the domain-specific object, if the object is stored remotely. If the domain-specific object is a versioned object, the reference may include an identifier. A reference to planning suite software for rendering the domain-specific object also may be included in the presentation file, resulting in a copy of the planning suite software being included in the presentation file.

Embodiments may permit running domain-specific code for domain-specific objects within the presentation software. To that end, the user of the presentation software may not have special access rights or even a connection to the planning database. Thus, the presentation file may be shared across platforms, with domain-specific visualizations, potentially without domain-rights management complicating the process.

Figure 5:
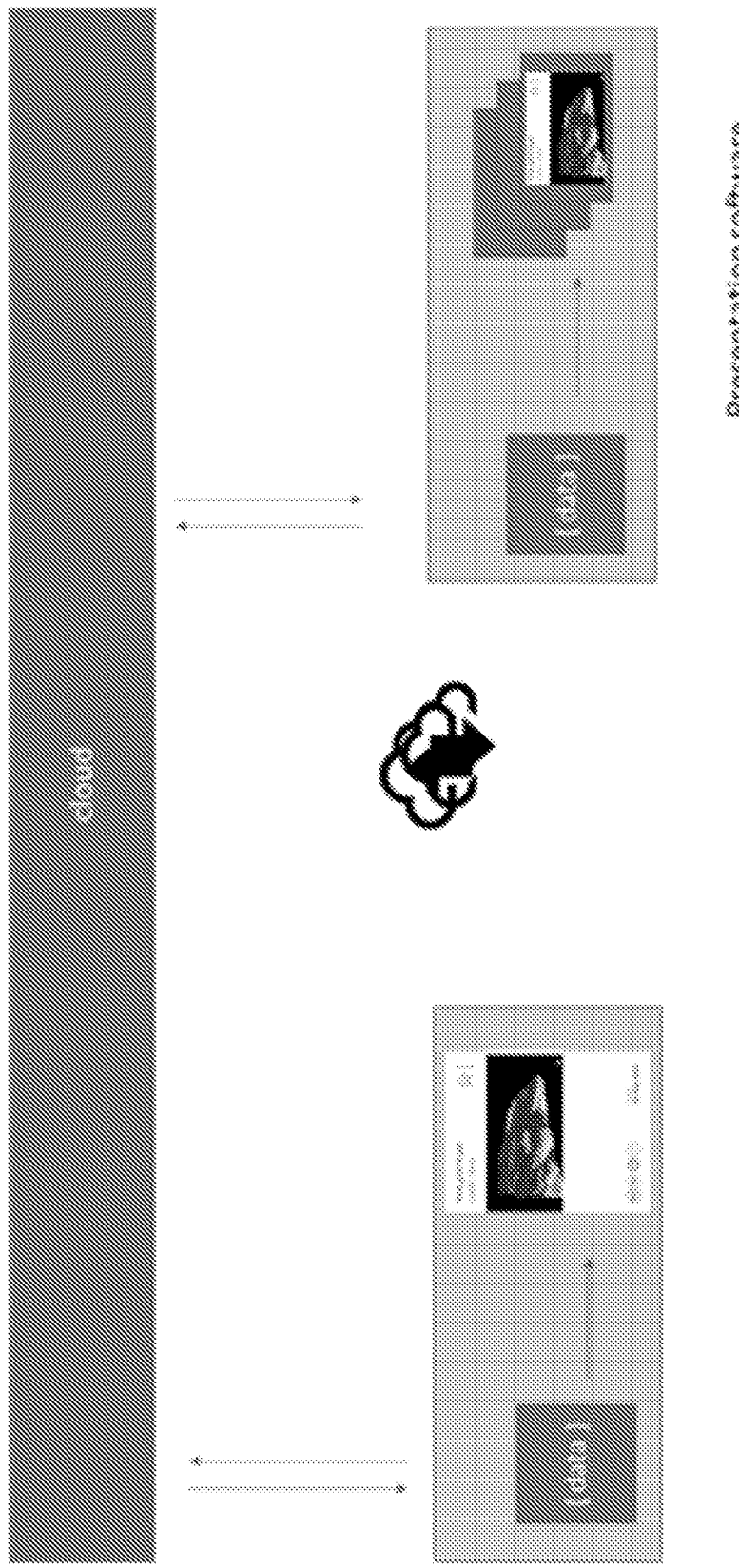
FIG. 5 illustrates a workflow for updating visualizations of an oilfield domain object in a presentation application, according to an embodiment.

Accordingly, the presentation management may be accomplished by an add-in in the presentation software. FIG. 5 illustrates a workflow for managing and updating presentation software with domain-specific data, according to an embodiment. The workflow may be at least partially accomplished by one or more processors executing such an add-in, which may be stored as instructions on a non-transitory, computer-readable medium. The add-in, for example, may cause the processor to perform the following:

1) Using the reference to the domain-specific data object to locate database storage of the domain software possibly in a cloud-based environment which is remotely accessible.
2) Connecting to the database and managing access rights.
3) Referencing a latest version of the domain-specific object in the database and sending a request to a server for a visualization.
4) In response to the sending of the request to the server, receiving a website including the visualization.
5) Embedding the website including the visualization in the presentation file for presentation by the presentation application.
6) Visualizing the object—this can include interactive features (size, color, zoom, value picking, etc.) for objects as the add-in interprets the domain-specific data structure correctly.

Accordingly, data from exploration planning software can be linked to presentation software files. This may serve to improve the acceptance of usage of exploration planning software. Because a latest version of the domain-specific object is copied into the presentation file, displayed results are automatically a latest version of the domain-specific object, which may inform decision making using up-to-date data, thereby avoiding "bad" decisions resulting from diverging or outdated file versions. As mentioned above, embodiments permit using data visualization of the exploration software within the presentation software. Compared with static, pictorial representations screenshots this improves the data visualization quality and allows controlling of the visualization in the presentation software.

In various embodiments, a user may copy objects such as, for example, a map object and other domain-specific data objects, from exploration software and may paste the map object and the other domain-specific data objects directly into a presentation file. A reference to software for rendering the map object also may be included in the presentation file. The add-in may cause the processor to perform the following:

1) Referencing the planning suite software for rendering the map.
2) Visualizing the object—this can include interactive features (size, color, zoom, value picking, etc.) for objects as the add-in interprets the domain-specific data structure correctly.

Figure 6:
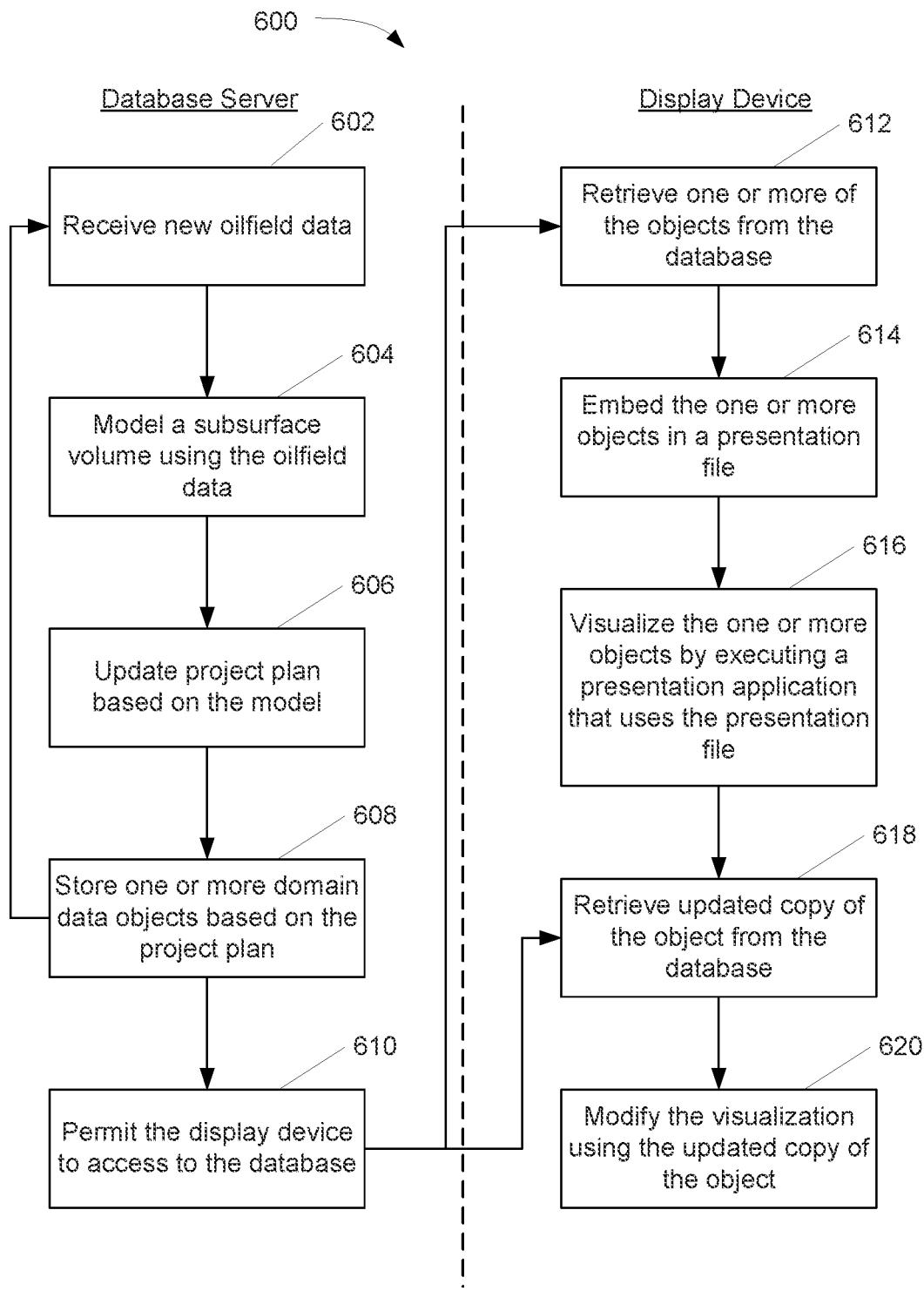
FIG. 6 illustrates a flowchart of a method for visualizing oilfield domain data using a presentation application, according to an embodiment.

FIG. 6 illustrates a flowchart of a method 600 for visualizing oilfield data, according to an embodiment. The method 600 includes a database server (e.g., cloud computer) receiving oilfield data, such as seismic data, well logs, etc., as at act 602. The method 600 then includes modeling a subsurface volume based at least in part on the oilfield data, as at act 604. Such modeling may include rock/fluid modeling, drilling simulations, or any other type of modeling for which oilfield data may be implemented. In some embodiments, the database server may not conduct the modeling, but may instead be a repository for the model, which may be created by another computer.

At act 606, the method 600 may then include updating a project plan (e.g., well plans, drilling plans, etc.) based on the modeling at act 604 using the data that was collected at act 602. The updated project plan may then be stored in a database, e.g., as one or more domain data objects, as at act 608, e.g., a cloud-based storage that is accessible remotely via the internet or another network. Again, in some embodiments, the database server may not generate or update the project plan, but rather merely stores the domain objects and/or the project plans.

The method 600 may include providing access to the database for a display device, such as a computer, as at act 610. The display device may retrieve one or more objects in the database, which are domain-specific and relate to the oilfield data and/or the project plans, as at act 612. For example, a well plan or one or more components thereof may be provided to and retrieved by the display device. The oilfield domain data object (e.g., a well log) may thus be created using domain-specific applications.

The display device may then embed the domain-specific object in a presentation file, as at act 614 and visualize the domain-specific object using a presentation application that executes using the presentation file, as at act 616. The object may include at least some of the functionality of the domain-specific software, e.g., native functionality for the file, such as zoom, pan, modify what data/attributes are displayed, etc. This is distinct from a pictorial representation, e.g., a screenshot or other static image, which may be limited to the information displayed at any given point. For example, the domain object may be embedded as a link or reference to a file on the database server, e.g., a uniform resource locator (URL). An add-in operating on the general-purpose presentation software may access the database via the URL and visualize the object that is returned from the URL.

In some embodiments, at a later point in time, the display device, again may request and retrieve an updated copy of the object as at act 618. The database may provide such updates, in view of newly-retrieved data, if the display device has the appropriate credentials. The database may provide the updated copy, in view of newly-retrieved data. The display device may then update the visualization based on the updates to the domain data object, as at act 620.

The methods described herein also can be used with wind farm development. Offshore wind farms involve a large number of machines (tens to hundreds of units) as well as a wide surface area (tens to hundreds of $km^2$). The ground stratigraphy, the mechanical properties of materials and their lateral and vertical variability may be accurately determined at each foundation location. Furthermore, a knowledge of the mechanical properties of shallow sediments is used over the cable routes, between wind turbines and to the coast. Field studies provide information regarding soils and rocks, up to a depth that will allow detecting the presence of weak formations able to impact the stability of the structure and/or generate excessive deformations (settlements). From seismic data and CPT logs, 3D subsurface models of geotechnical properties are generated. This subsurface model is used for site characterization and monitoring. The seismic data and CPT logs are also collected over time, thus providing data from which the parameters discussed above may be collected.

Figure 7:
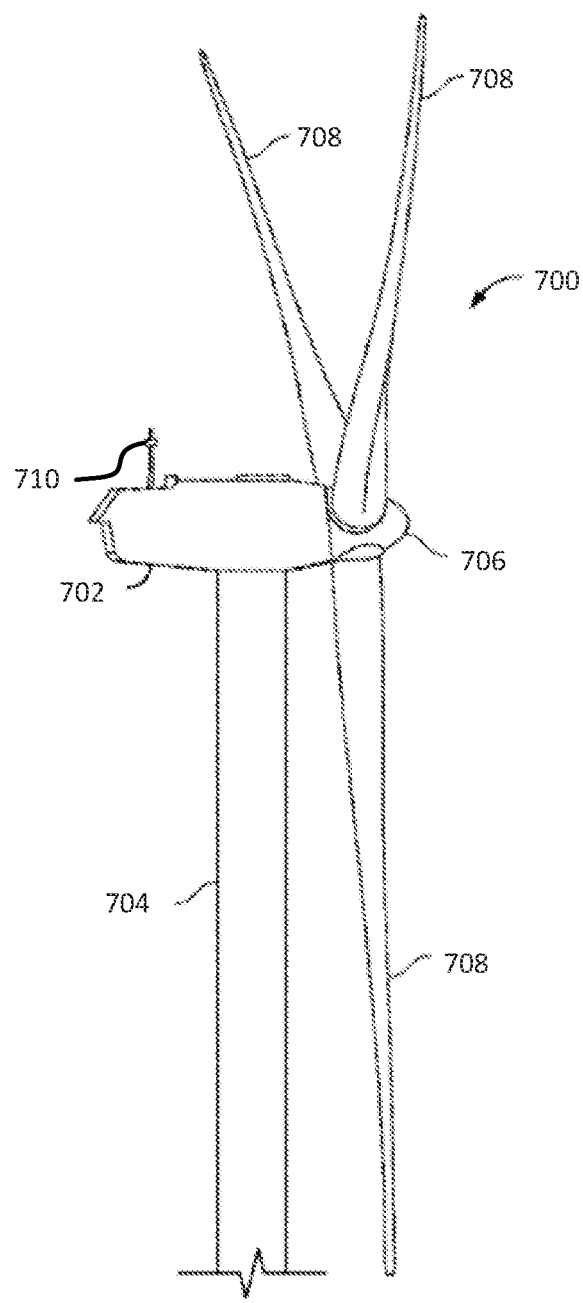
FIG. 7 illustrates a side elevational view of a wind turbine, according to an embodiment.

As shown in FIG. 7, a wind turbine 700 generally includes a nacelle 702, which houses a generator. In an embodiment, the nacelle 702 is a housing mounted atop a tower 704, a portion of which is shown in FIG. 7. The tower 704 may be on land or at sea. The height of tower 704 is selected based upon factors and conditions known in the art, and may extend to heights up to 100 meters or more. The wind turbine 700 may be installed on any terrain providing access to areas having desirable wind conditions. The terrain may vary greatly and may include, but is not limited to, mountainous terrain or offshore locations. The wind turbine 700 also includes a rotor 706 that has one or more rotor blades 708. Although the wind turbine 700 illustrated in FIG. 7 includes three rotor blades 708, there are no specific limits on the number of rotor blades 708 that may be employed.

The wind turbine 700 utilizes one or more cameras, sensors, and other devices 710 that may emit data for transmission to a remote location for analysis to determine whether components are missing, damaged or otherwise require maintenance. In addition, if unauthorized personnel are detected, authorities or emergency services may be contacted and/or dispatched to the wind turbine 700 and tower 704.

Figure 8:
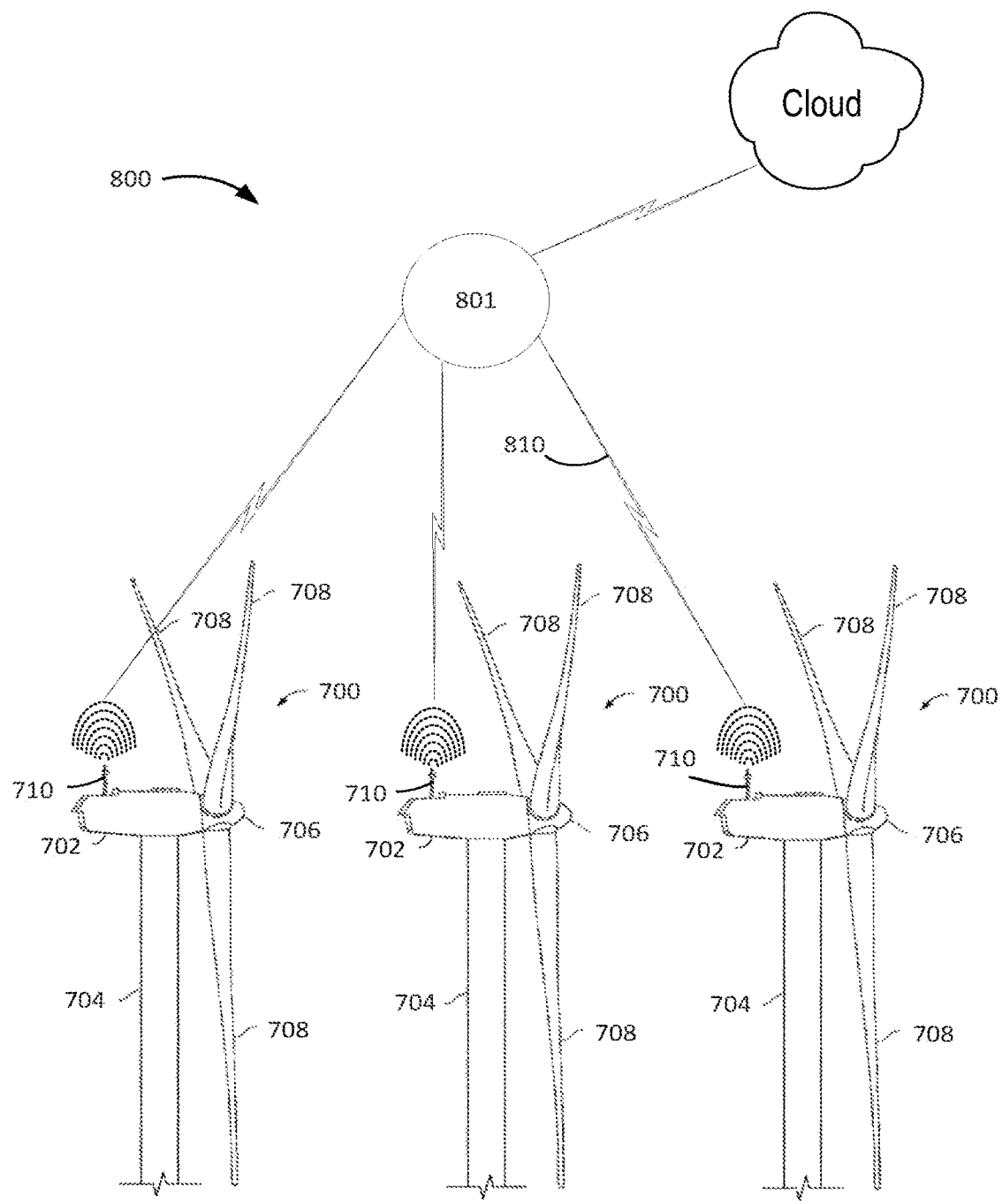
FIG. 8 illustrates a wind turbine farm, according to an embodiment.

FIG. 8 illustrates a wind turbine monitoring system 800, according to an embodiment. The system 800 includes a central monitoring device 801 and a plurality of wind turbines 700 in one or more fields. Any number of wind turbines 700 may be employed in the system 800.

A device 710 is mounted on or within one or more of the wind turbines 700 and respective towers 704, and generates data 810 that may include operating and/or environmental conditions, computational capability of the data processing infrastructure (including ability to manage and use cryptography keys, hashes and capabilities), equipment-related data, sensor data and measurements, maintenance information, visual data from camera(s), and the like. The central monitoring device 801 may be a data acquisition device such as a computer, a data storage device, or other analysis tool. In another embodiment, the central monitoring device 801 may be a communication device, tablet, or other computational device usable by personnel. In another embodiment, the central monitoring device 801 is the power control for a wind turbine farm or a utility operating the wind turbine farm. The central monitoring device 801 may be autonomous or may be integrated within the wind farm control. The data 810 may be transmitted to and/or from the wind turbine 700 and tower 704 in order to provide control or otherwise communicate with the wind turbine 700 in response to a condition requiring maintenance in response to any received signals. In certain embodiments, equipment or other operational parameters may be transmitted and received.

While in FIG. 8, the data 810 emitted from device 710 is via wireless transmission according to typical methods, in other embodiments, wired connections, such as via ethernet, may be used for data transmission to central monitoring device 801.

Figure 9:
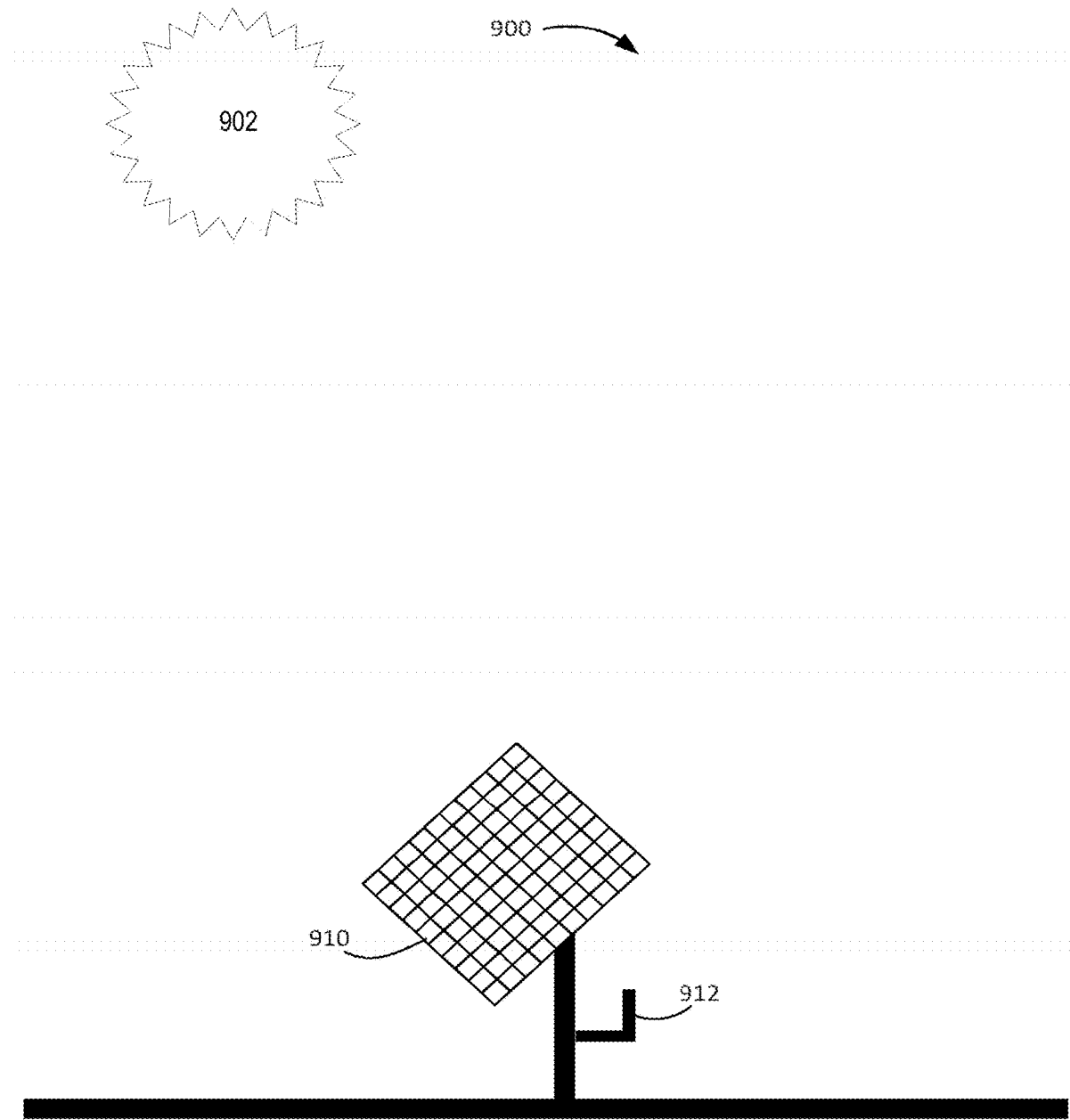
FIG. 9 illustrates a solar panel, according to an embodiment.

The methods described herein also can be used in conjunction with solar energy. For example, some embodiments may be employed in predicting economic indicators and selecting among projects related to solar arrays, e.g., to determine site feasibility from an economic perspective. FIG. 9 illustrates an example of such a solar power generation site 900. The sun 902 emits radiation collected by a solar panel 910, which includes an instrumentation package 912 utilizing one or more cameras, sensors, and other devices that may emit data for transmission to a remote location for analysis to determine whether components are missing, damaged or otherwise require maintenance.

Figure 10:
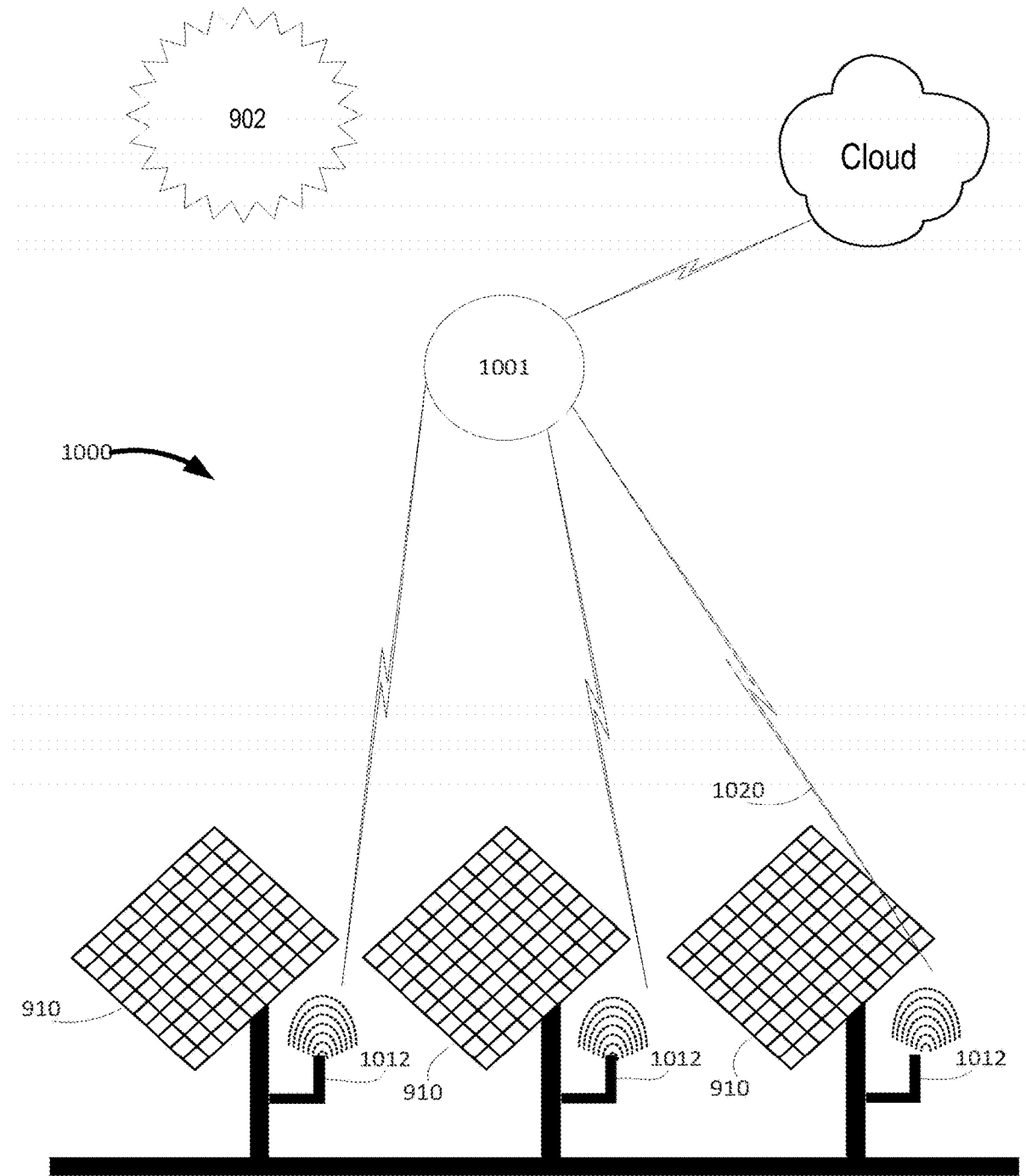
FIG. 10 illustrates a solar panel farm, according to an embodiment.

FIG. 10 shows a solar panel monitoring system 1000, according to an embodiment. The system 1000 includes a central monitoring device 1001 and a plurality of solar panels 910 in one or more fields. The number of panels 910 in the system 1000 is not limited and may include one or a large number of panels. Instrumentation package 1012 is mounted on or within one or more of the panels, and generates data 1020 that may include without limitation operating and environmental conditions, equipment-related data, sensor data and measurements, maintenance information, visual data from camera(s), and the like. The central monitoring device 1001 may be a data acquisition device such as a computer, a data storage device, or other analysis tool. In another embodiment, the central monitoring device 1001 may be a communication device, tablet, or other computational device usable by personnel. In another embodiment the central monitoring device 1001 is the power control for a solar panel farm or a utility operating the farm. The central monitoring device 1001 may be autonomous or may be integrated within the solar panel farm control. The data 1020 may be transmitted to and/or from the panel 910 in order to provide control or otherwise communicate with the panel 910 in response to a condition requiring maintenance in response to any received signals. In certain embodiments, equipment or other operational parameters may be transmitted and received.

The methods described herein also can be used to present an output of CO2-specific objects in presentations. CO2 subsurface management (site characterization and monitoring, economic CO2 project management) may be used to collect parameters and economic indicators. 3D surface seismic, microseismic, x-well seismic and electromagnetic data, vertical seismic profiles, surface and borehole gravity, logs, etc. may be received. Porosity data, CO2 (gas) saturation, plume movement, seal integrity, injectivity, ground movement, etc. may be generated.

Figure 11:
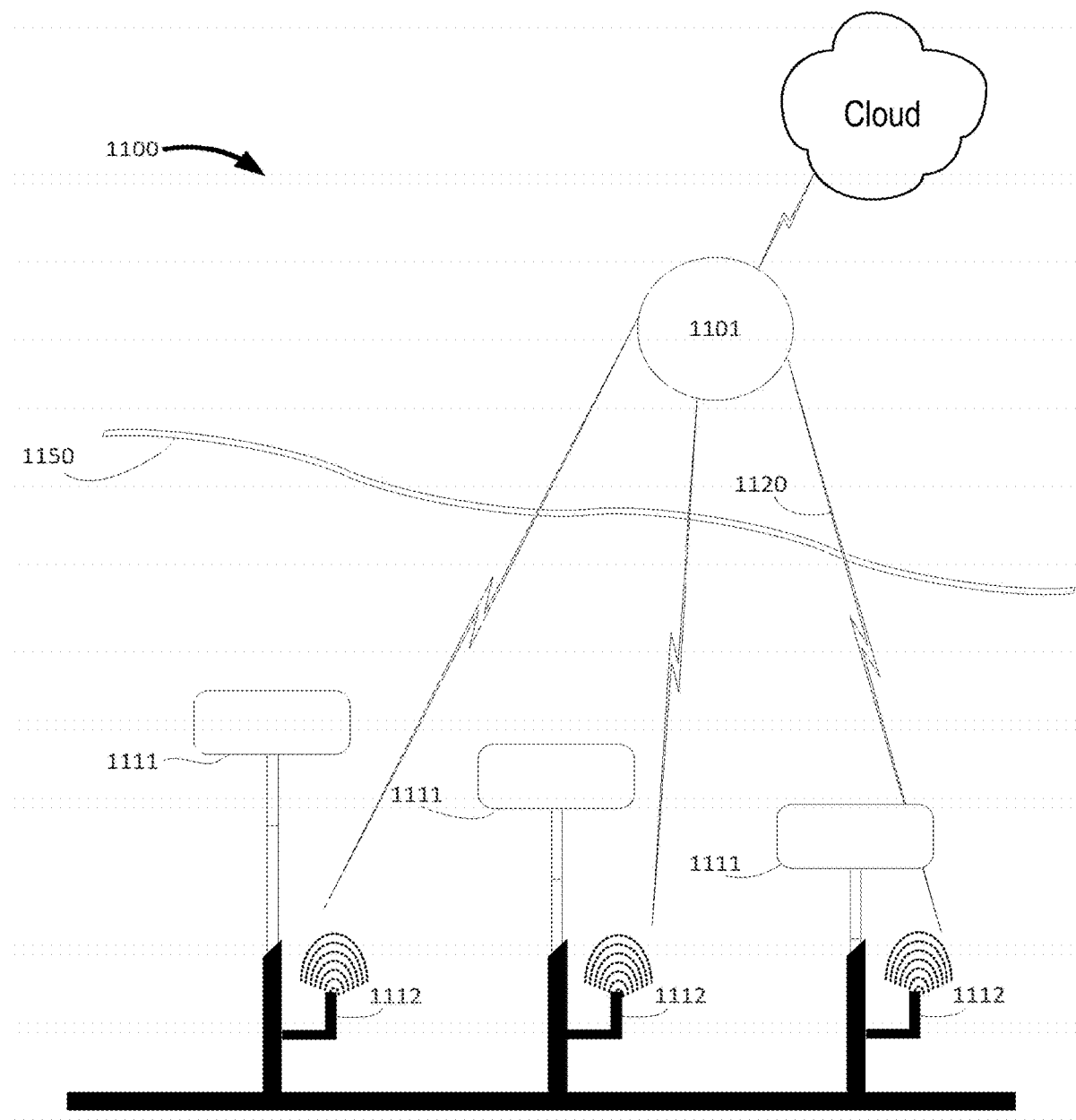
FIG. 11 illustrates an ocean power generation farm, according to an embodiment.

The methods described herein also can be used with tidal and other hydrodynamic power generation sources. For example, in FIG. 11, the ocean 1150 has wave and tidal fluctuations that move one or more water-based power generation devices that include buoyant actuators 1111, whose overall system assemblies include an instrumentation package 1112 utilizing one or more cameras, sensors, and other devices that may emit data for transmission to a remote location for analysis to determine whether components are missing, damaged or otherwise require maintenance. In addition, if unauthorized personnel or testy sharks are detected, authorities or emergency services may be contacted and/or dispatched to the water-based power generation devices.

System 1100 according to an embodiment of the present disclosure includes a central monitoring device 1101 and a plurality of water-based power generation devices that include buoyant actuators 1111 in one or more fields in the sea. The number of water-based power generation devices in the system 1100 is not limited and may include one or a large number. Instrumentation package 1112 is located on or within the water-based power generation devices, and generates data 1120 that may include without limitation operating and environmental conditions, equipment-related data, sensor data and measurements, maintenance information, visual data from camera(s), and the like. The central monitoring device 1101 may be a data acquisition device such as a computer, a data storage device, or other analysis tool, either above or below the surface of the ocean 1150. In some embodiments, the central monitoring device 1101 may be on a vessel. In another embodiment, the central monitoring device 1101 may be a communication device, tablet, or other computational device usable by personnel. In another embodiment the central monitoring device 1101 is the power control facility on land for the utility operating the array of water-based power generation devices. The central monitoring device 1101 may be autonomous or may be integrated within the controls for the array. The data 1120 may be transmitted to and/or from the water-based power generation device(s) in order to provide control or otherwise communicate in response to a condition requiring maintenance in response to any received signals. In certain embodiments, equipment or other operational parameters may be transmitted and received.

Figure 12:
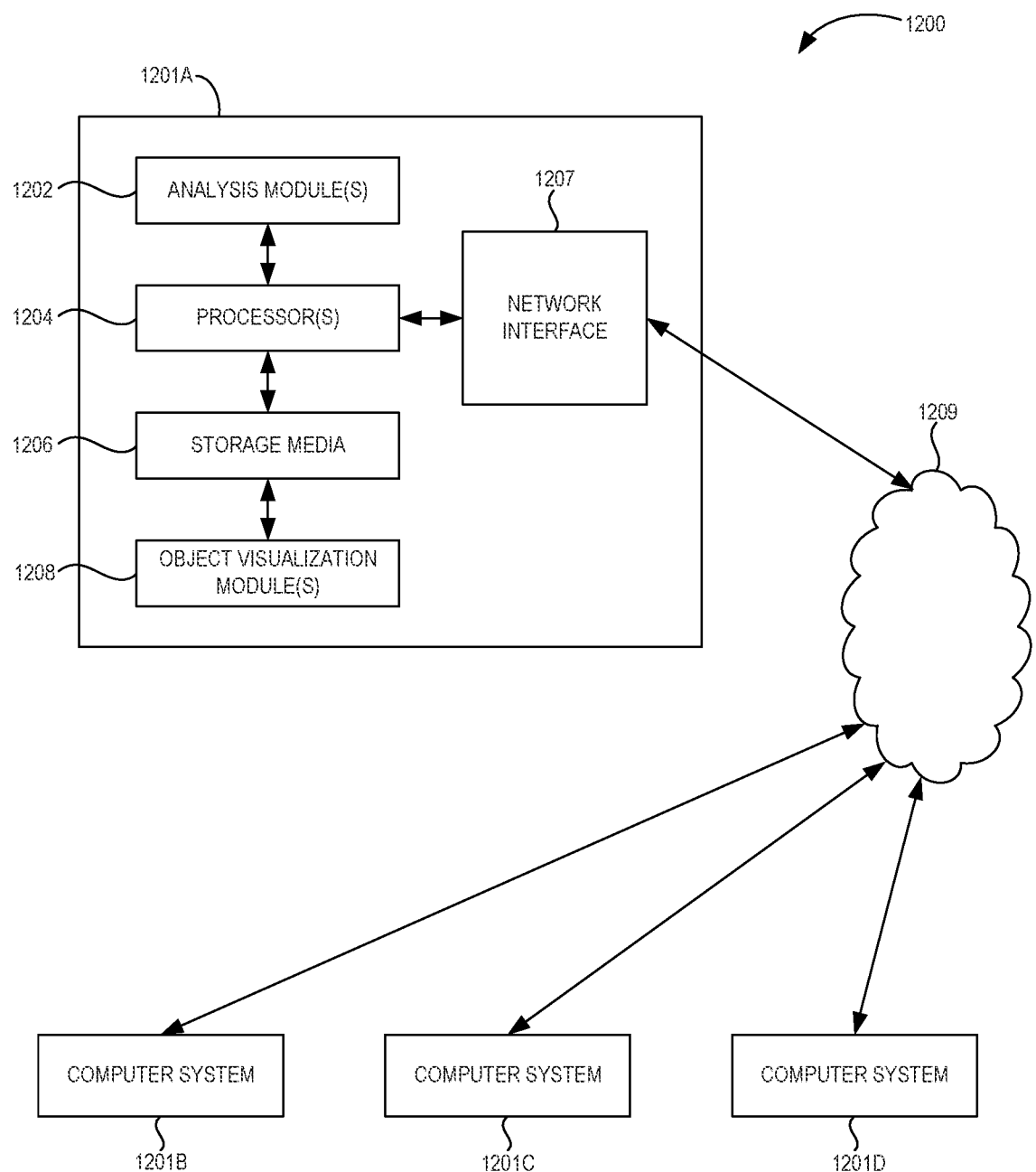
FIG. 12 illustrates a schematic view of a computing system, according to an embodiment.

In some embodiments, the methods of the present disclosure may be executed by a computing system. FIG. 12 illustrates an example of such a computing system 1200, in accordance with some embodiments. The computing system 1200 may include a computer or computer system 1201A, which may be an individual computer system 1201A or an arrangement of distributed computer systems. The computer system 1201A includes one or more analysis modules 1202 that are configured to perform various tasks according to some embodiments, such as one or more methods disclosed herein. To perform these various tasks, the analysis module 1202 executes independently, or in coordination with, one or more processors 1204, which is (or are) connected to one or more storage media 1206. The processor(s) 1204 is (or are) also connected to a network interface 1207 to allow the computer system 1201A to communicate over a data network 1209 with one or more additional computer systems and/or computing systems, such as 1201B, 1201C, and/or 1201D (note that computer systems 1201B, 1201C and/or 1201D may or may not share the same architecture as computer system 1201A, and may be located in different physical locations, e.g., computer systems 1201A and 1201B may be located in a processing facility, while in communication with one or more computer systems such as 1201C and/or 1201D that are located in one or more data centers, and/or located in varying countries on different continents).

A processor may include a microprocessor, microcontroller, processor module or subsystem, programmable integrated circuit, programmable gate array, or another control or computing device.

The storage media 1206 may be implemented as one or more computer-readable or machine-readable storage media. Note that while in the example embodiment of FIG. 12 storage media 1206 is depicted as within computer system 1201A, in some embodiments, storage media 1206 may be distributed within and/or across multiple internal and/or external enclosures of computing system 1201A and/or additional computing systems. Storage media 1206 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 1200 contains one or more object visualization module(s) 1208. In the example of computing system 1200, computer system 1201A includes the object visualization module 1208. In some embodiments, a single object visualization module may be used to perform some aspects of one or more embodiments of the methods disclosed herein. In other embodiments, a plurality of object visualization modules may be used to perform some aspects of methods herein.

It should be appreciated that computing system 1200 is merely one example of a computing system, and that computing system 1200 may have more or fewer components than shown, may combine additional components not depicted in the example embodiment of FIG. 12, and/or computing system 1200 may have a different configuration or arrangement of the components depicted in FIG. 12. The various components shown in FIG. 12 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 1200, FIG. 12), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method for visualizing energy data, comprising:
retrieving an energy domain data object from a database, wherein the energy domain data object was created based on collected energy data using an energy domain software application;
embedding the energy domain data object in a presentation file, wherein the embedding the energy domain data object in the presentation file comprises:
creating a reference to the energy domain data object in the presentation file; and
creating a reference in the presentation file to computer instructions for visualizing the energy domain data object;
visualizing the energy domain data object by executing a presentation application using the presentation file, wherein the visualizing the energy domain data object comprises:
sending a request to a server in response to detecting the reference to the embedded energy domain data object in the presentation file;
receiving a website from the server with a visualization of the energy domain data object in response to the sending of the request to the server; and
embedding the website with the visualization in the presentation file for visualizing by the presentation application;
adjusting one or more parameters of the energy domain data object from the presentation file;
retrieving, at a second point in time, an updated copy of the energy domain data object from the database using the presentation file; and
modifying a visualization of the energy domain data object based on the updated copy of the energy domain data object.

2. The method of claim 1, wherein the retrieving the energy domain data object from the database further comprises:
accessing the energy domain data object via the reference to the energy domain data object included in the presentation file.

3. The method of claim 1, further comprising:
copying map data and other domain-specific data directly into the presentation file;
interactively visualizing a map and the other domain-specific data based on the map data and the other domain-specific data in the presentation file; and
obtaining location data from the map data in the presentation file.

4. The method of claim 3, further comprising:
zooming in and out on the visualized map in the presentation file.

5. The method of claim 1, wherein:
the presentation file is a PowerPoint file.

6. The method of claim 5, wherein:
the creating the reference to the computer instructions is performed by using an add-in to a PowerPoint application.

7. A computing system, comprising:
one or more processors; and
a memory system comprising one or more non-transitory computer-readable media storing instructions that, when executed by at least one of the one or more processors, cause the computing system to perform operations, the operations comprising:
retrieving an energy domain data object from a database, wherein the energy domain data object was created based on collected energy data using an energy domain software application;
embedding the energy domain data object in a presentation file, wherein the embedding the energy domain data object in the presentation file comprises:
creating a reference to the energy domain data object in the presentation file; and
creating a reference in the presentation file to computer instructions for visualizing the energy domain data object;
visualizing the energy domain data object by executing a presentation application using the presentation file, wherein the visualizing the energy domain data object comprises:
sending a request to a server in response to detecting the reference to the embedded energy domain data object in the presentation file;
receiving a website from the server with a visualization of the energy domain data object in response to the sending of the request to the server; and
embedding the website with the visualization in the presentation file for visualizing by the presentation application;
visualizing the energy domain data object by executing a presentation application using the presentation file;
adjusting one or more parameters of the energy domain data object in the presentation file;
retrieving, at a second point in time, an updated copy of the energy domain data object from the database using the presentation file; and
modifying a visualization of the energy domain data object based on the updated copy of the energy domain data object.

8. The computing system of claim 7, wherein the retrieving the energy domain data object from the database further comprises:
accessing the energy domain data object via the reference to the energy domain data object included in the presentation file.

9. The computer system of claim 7, wherein the operations further comprise:
copying map data and other domain-specific data directly into the presentation file;
interactively visualizing a map and the other domain-specific data based on the map data and the other domain-specific data in the presentation file; and
obtaining location data from the map data in the presentation file.

10. The computer system of claim 9, wherein the operations further comprise:
zooming in and out on the visualized map in the presentation file.

11. The computer system of claim 7, wherein:
the presentation file is a PowerPoint file.

12. The computer system of claim 11, wherein:
the creating the reference to the computer instructions is performed by using an add-in to a PowerPoint application.

13. A non-transitory computer-readable medium storing instructions that, when executed by one or more processors of a computing system, cause the computing system to perform operations, the operations comprising:
retrieving an energy domain data object from a database, wherein the energy domain data object was created based on collected energy data using an energy domain software application;
embedding the energy domain data object in a presentation file, wherein the embedding the energy domain data object in the presentation file comprises:
creating a reference to the energy domain data object in the presentation file; and
creating a reference in the presentation file to computer instructions for visualizing the energy domain data object;
visualizing the energy domain data object by executing a presentation application using the presentation file, wherein the visualizing the energy domain data object comprises:
sending a request to a server in response to detecting the reference to the embedded energy-domain data object in the presentation file;
receiving a website from the server with a visualization of the energy-domain data object in response to the sending of the request to the server; and
embedding the website with the visualization in the presentation file for visualizing by the presentation application;
adjusting one or more parameters of the energy domain data object in the presentation file;
retrieving, at a second point in time, an updated copy of the energy domain data object from the database using the presentation file; and
modifying a visualization of the energy domain data object based on the updated copy of the energy domain data object.

14. The non-transitory computer-readable medium of claim 13, wherein the retrieving the energy domain data object from the database further comprises:
accessing the energy domain data object via the reference to the energy domain data object included in the presentation file.

15. The non-transitory computer-readable medium of claim 13, wherein the operations further comprise:
copying map data and other domain-specific data directly into the presentation file;
interactively visualizing a map and the other domain-specific data based on the map data and the other domain-specific data in the presentation file; and
obtaining location data from the map data in the presentation file.

16. The non-transitory computer-readable medium of claim 15, wherein the operations further comprise:
zooming in and out on the visualized map in the presentation file.

17. The non-transitory computer-readable medium of claim 13, wherein:
the presentation file is a PowerPoint file; and
the creating the reference to the computer instructions is performed by using an add-in to a PowerPoint application.

* * * * *